June 6, 1961
M. BERNATH
2,987,362
RELEASABLE FASTENING MEANS FOR PARTS
FOR AN ARTICLE OF FURNITURE
Filed Aug. 22, 1958
4 Sheets-Sheet 1
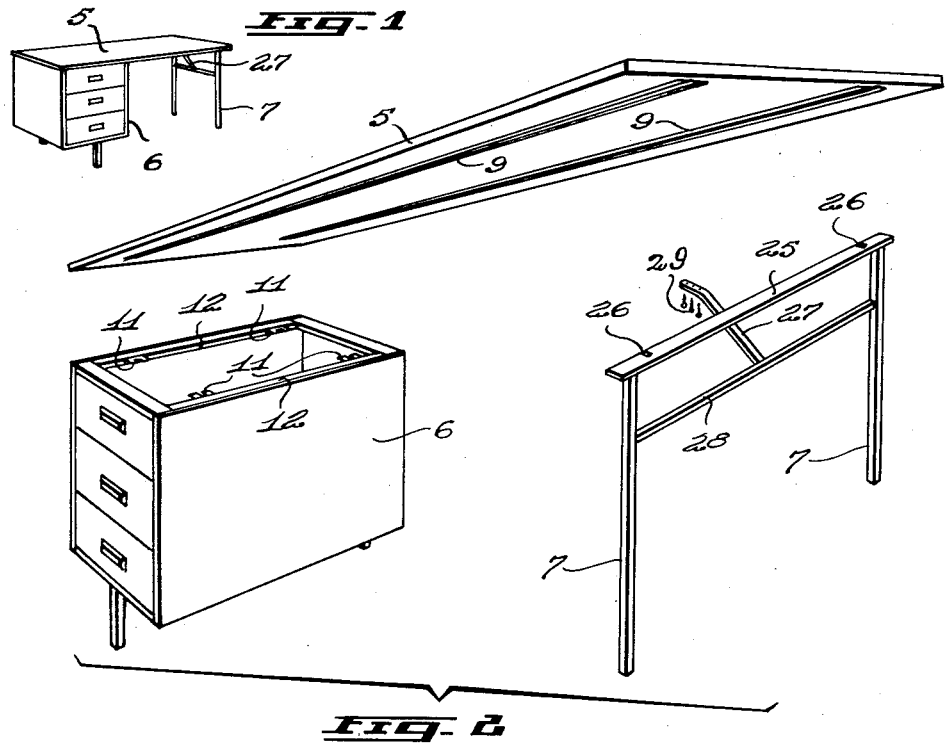
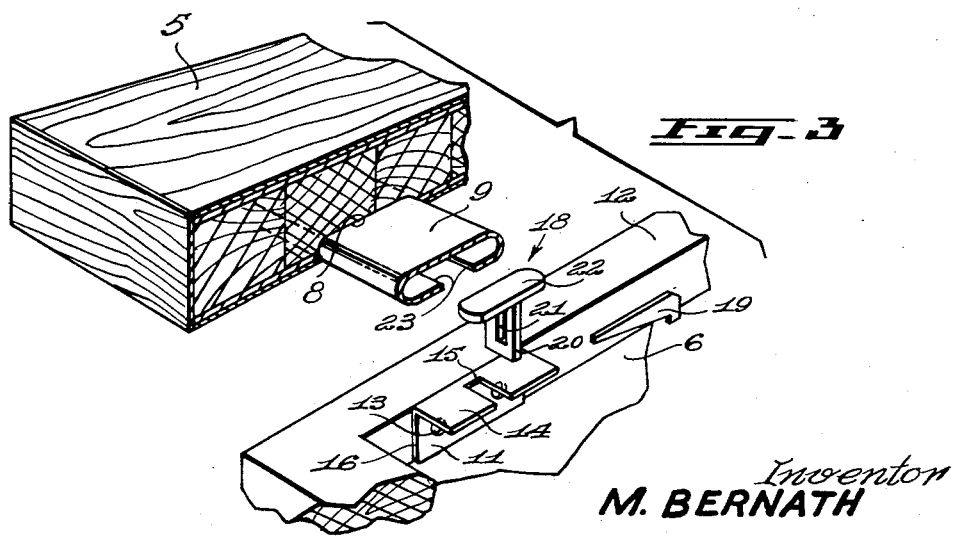
Inventor
M. BERNATH
By Featherstonhaugh & Co.
Attorneys

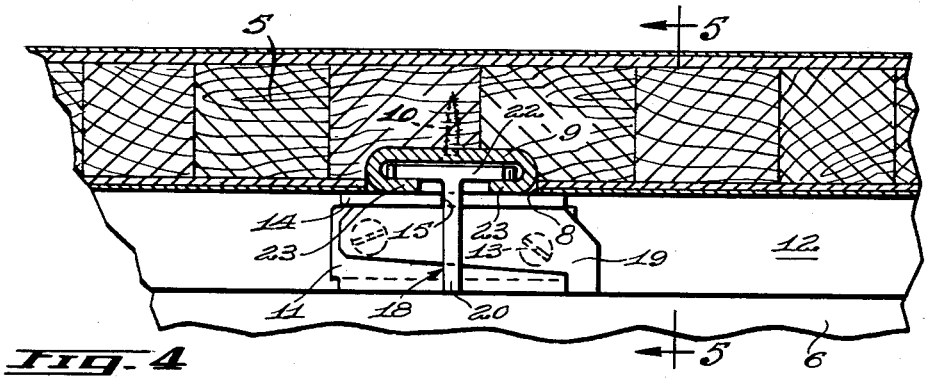
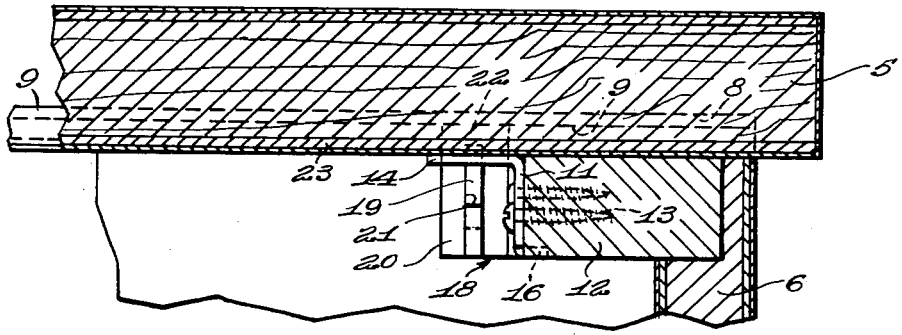
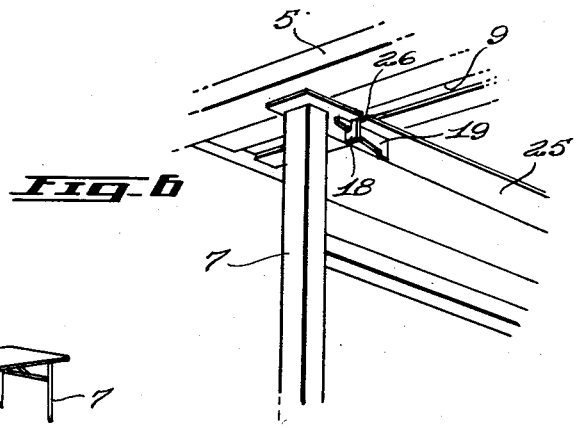
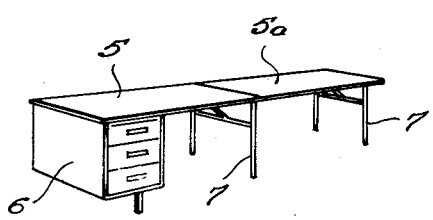

June 6, 1961 M. BERNATH 2,987,362
RELEASABLE FASTENING MEANS FOR PARTS
FOR AN ARTICLE OF FURNITURE
Filed Aug. 22, 1958 4 Sheets-Sheet 3
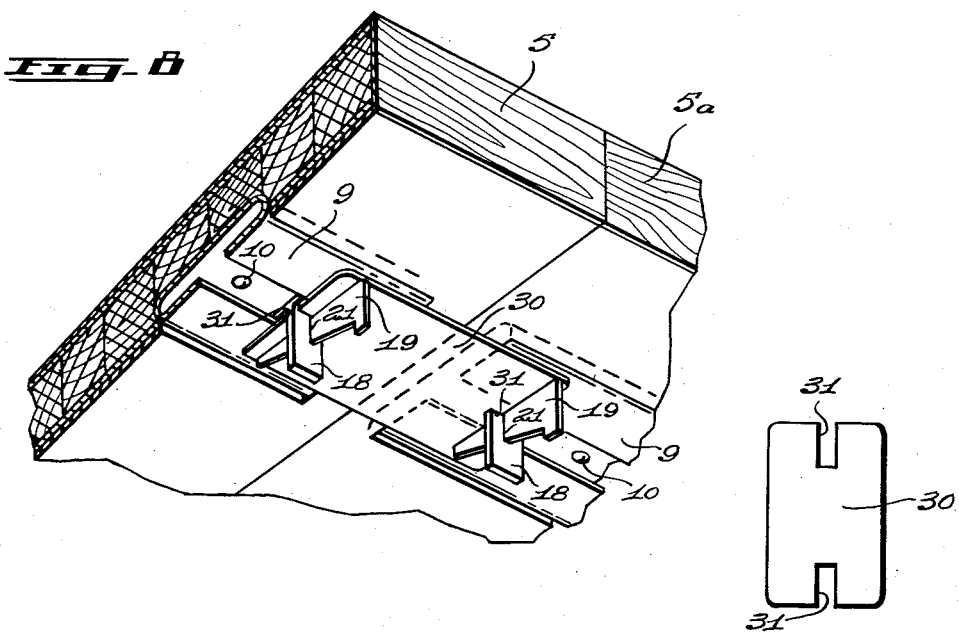
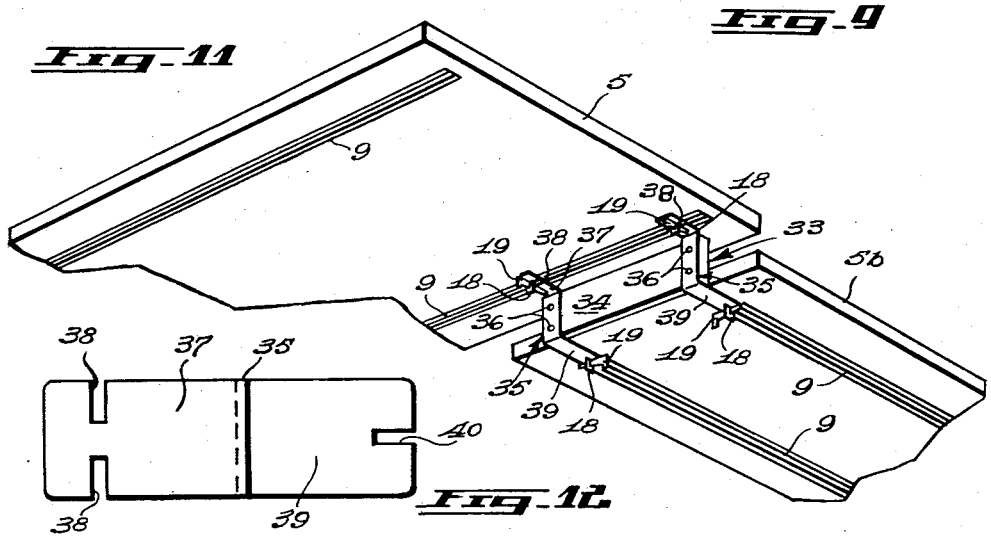
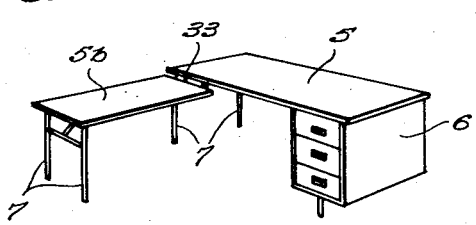
Inventor
M. BERNATH
By Fetherstonhaugh & Co.
Attorneys

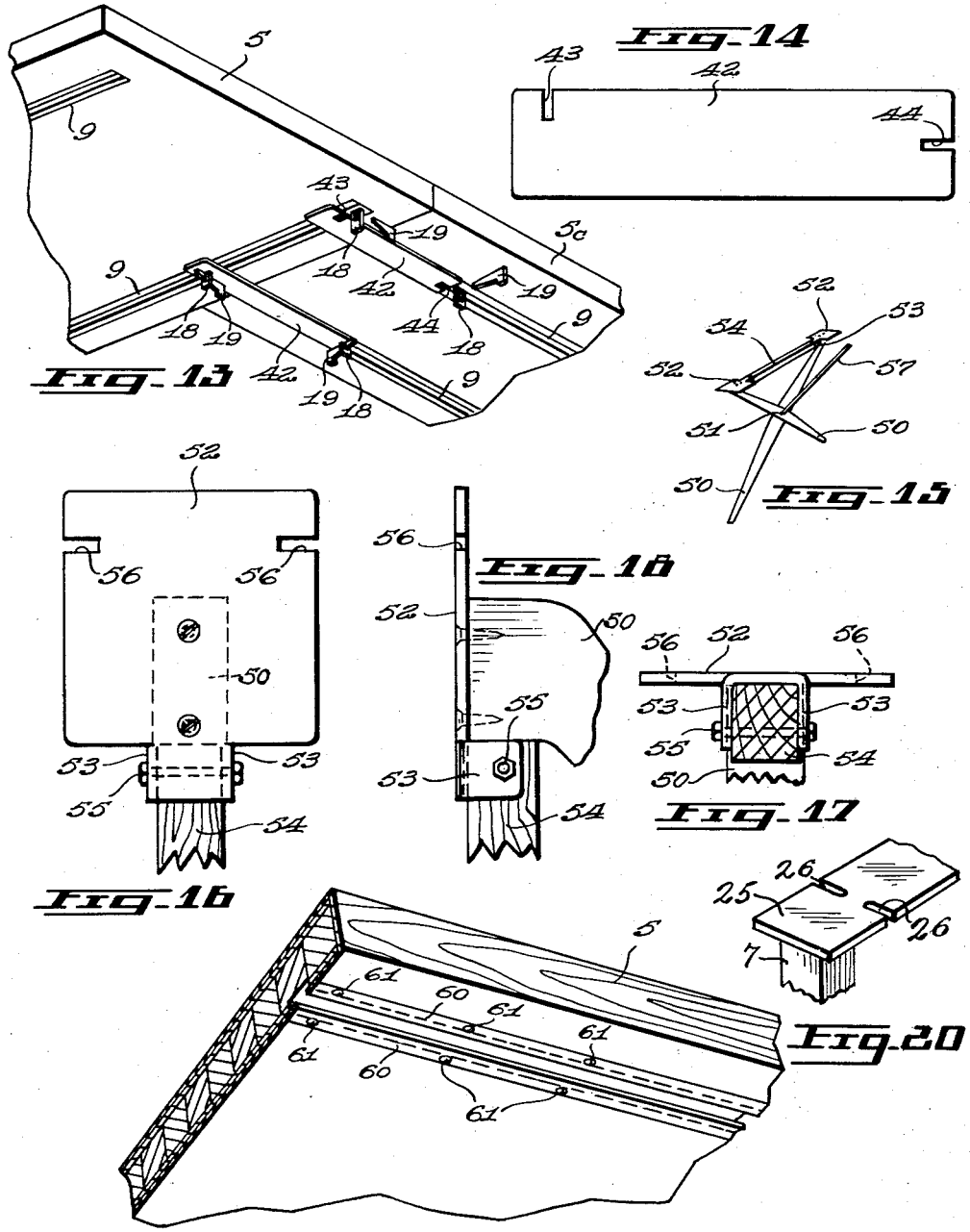

United States Patent Office 2,987,362
Patented June 6, 1961

2,987,362
RELEASABLE FASTENING MEANS FOR PARTS FOR AN ARTICLE OF FURNITURE
Michael Bernath, Mount Royal, Quebec, Canada, assignor to Art Woodwork Limited, Montreal, Quebec, Canada
Filed Aug. 22, 1958, Ser. No. 756,637
10 Claims. (Cl. 312—257)

This invention relates to improvements in articles of furniture and in particular to fastening means for connecting together separable parts of an article of furniture.

A particular object of this invention is to provide two or more parts of an article of furniture with fastening means by which one part may be separably connected to the other part in one of several positions relative to one another. This is accomplished by providing one part with one or more T-grooved tracks in which a T-shaped connecting member is free to travel longitudinally in the T-groove of the track, and providing another part with a slotted connecting plate which is adapted to be positioned against the track of the first part so that the slot of said plate is aligned with the groove of the track and so that the shank of the T-shaped connecting member extends through the slot in said plate, and means fitted in a slot provided in the shank of the T-shaped connecting member for wedging engagement with the plate of the second part to secure said plate and the adjacent surface of the track carried by the first part in contact with one another.

The above arrangement particularly as applied to an article of furniture such as a desk or table renders the article of furniture readily adaptable to changes, alterations and re-arrangement of parts. For example, a table top of any suitable length and/or breadth may be assembled with leg structure, pedestal structures, or a combination of both. The provision of tracks beneath the table top enables the adjustment of the T-shaped connecting members anywhere along the length of the tracks so that one or more pedestals to which the said plates are attached may be located at either end of the table top and at any desired distance inwardly from the selected end of the table top. This is equally applicable for the connecting of one or more leg struuctures to the table top. In addition, the fastening means according to this invention may be adapted for the connection of two table tops either in the same or different horizontal planes.

The above and other objects and characteristic features of this invention will be understood more readily from the following detailed description taken in connection with the accompanying drawings, in which—

FIG. 1 is a perspective view of one embodiment of my invention.

FIG. 2 is an exploded view in perspective of the desk shown in FIG. 1.

FIG. 3 is an exploded view in perspective of a fragment of the table top and pedestal shown in FIGS. 1 and 2 and detailing the assembly parts.

FIG. 4 is a fragmentary view in section of the parts shown in FIG. 3 in assembled relation.

FIG. 5 is a sectional view taken along the line 5—5 of FIG. 4.

FIG. 6 is a fragmentary perspective view showing a portion of the leg and table top of FIGS. 1 and 2 in assembled relation.

FIG. 7 is a perspective view of another embodiment of my invention.

FIG. 8 is a fragmentary view in perspective showing the assembly of certain portions of the embodiment of FIG. 7.

FIG. 9 is a detail view of one of the parts shown in FIG. 8.

FIG. 10 is a perspective view of a further embodiment.

FIG. 11 is a perspective view showing the assembly of certain portions of the embodiment of FIG. 10.

FIG. 12 is a detail view of one of the parts shown in FIG. 11.

FIG. 13 is a perspective view showing a further modified assembly of certain parts.

FIG. 14 is a detail view of one of the parts shown in FIG. 13.

FIG. 15 is a perspective view of a modified leg assembly.

FIGS. 16 to 18 are bottom plan, end and side views respectively, of one of the parts shown in FIG. 15.

FIG. 19 is a fragmentary perspective view of a table top showing a modified form of track on the undersurface thereof.

FIG. 20 is a fragmentary view in perspective illustrating a further modified leg assembly.

Referring more particularly to FIGS. 1 to 6 of the drawings, the desk generally comprises three separable sections including a table top 5, a pedestal 6 and a leg structure 7. The table top 5 is provided on the underside with two longitudinally extending, laterally spaced grooves 8 to receive channel-shaped tracks 9 having inturned flanges 23 which form the rails of the track. The track 9 is secured in each groove 8 by screws 10.

The pedestal 6 is here shown to be in the form of a single tier, multi-drawer compartment but may be in the form of a cabinet or a multi-tier, multi-drawer compartment and cabinet. The pedestal is provided with brackets 11 which are secured by screws 13 along the inner edge of the opposing top side rails 12 of the pedestal. Two brackets 11 are arranged in laterally spaced relation on each top side rail 12 so that one will correspond with one track 9 of the table top and the other will correspond with the second track 9.

As will be seen each bracket 11 has one flange secured to the inner surface of the top side rail 12 so that a second flange projects inwardly from the side rail 12, as indicated at 14. The flange 14 is provided with a transverse slot 15. The brackets 11 may be angle shaped or may have a third flange 16 which underlies the side rail 12 in a recess provided therefor.

The table top 5 and pedestal 6 are united by a T-shaped connector member 18 and a wedge 19. The T-shaped connector member 18 includes an elongated narrow shank 20 provided with an elongated vertical slot 21 and a head 22 of a width equal to the width of the shank, the flanges of the head extending on either side of the shank for a combined length substantially greater than the width thereof. The head 22 of T-shaped connector member 18 is inserted lengthwise through the opening in channel-shaped track 9 and is then rotated so that the flanges of the head 22 are engaged by the inturned flanges 23 of the channel-shaped track 9. The pedestal 6 and table top 5 are brought together so that pairs of T-shaped connector members 18 carried by each of the channel-shaped tracks 9 in the table top have their shanks 20 fitted in the slots 15 in the flanges 14 of brackets 11. A wedge 19 is then inserted in vertical slot 21 of shank 20 to bear against the underside of flange 14, thus securing the adjacent surfaces of the table top and the pedestal in abutting engagement.

The leg structure 7 includes a cross-plate 25 provided with slots 26 in one side thereof which are laterally spaced apart a distance equal to the spacing of the channel-shaped tracks 9 in the table top 5. T-shaped connector members 18 projecting from channel-shaped tracks 9 extend into the slots 26 of cross plate 25 and are retained therein by wedges 19 which serve to secure the table top and leg structure together in abutting engagement. A bracket 27 extending from one side of an intermediate cross-tie 28 between the legs has its upper end secured by screws 29 to the underside of the table top to stabilize the leg structure. It will be apparent that where desired a second pedestal 6 may be mounted on the underside of the table top in substitution for the leg structure 7. Another modification could be the provision of a leg structure exteriorly of the pedestal to support that end of the table in lieu of the foot extensions shown beneath the pedestal in FIG. 1. In this instance suitable stabilizing means will be provided between the legs and the pedestal in place of the stabilizing bracket 27.

In FIGS. 7 to 9, I have illustrated a modification in which the assembly shown in FIGS. 1 to 6 is provided with an additional table top 5a as an endwise extension of the first table top 5. As will be seen in FIGS. 8 and 9 the table tops 5 and 5a are positioned in abutting end-to-end engagement. A connecting plate 30 provided with end slots 31 extends between each of the aligned channel-shaped tracks 9 of said table tops and a T-shaped connector member 18 carried by each channel-shaped track 9 is inserted in each of the end slots 31 of plate 30. Wedges 19 fitted in the vertical slots 21 of the members 18 bear against the plate 30 to secure said plate at each end against the underside of the corresponding table top. While I have also shown the second table top 5a to be supported at its outer end by a leg structure 7, it will be appreciated that a pedestal 6 may be substituted for said leg structure. The pedestal 6 will be secured to the table top 5a in the manner previously described.

FIGS. 10 to 12 illustrates a further modification in which a second table top 5b is secured to the first table top 5 at right angles thereto and at a lower level. This lower level table extension is desirable for the support of a typewriter or similar machine. Here again the leg structure 7 may be replaced by a pedestal 6 for the support of the outer end of said table extension. As will be seen more particularly in FIGS. 11 and 12, the table tops 5 and 5b are joined by an offset connecting unit 33 including a vertical spacer 34 and a pair of Z-section brackets 35 secured in laterally spaced relation to said spacer by screws 36. The upper arm 37 of brackets 35 has slots 38 extending inwardly from opposing side edges thereof and the lower arm 39 has an end slot 40. A pair of T-shaped connector members 18 carried by the channel-shaped track 9 adjacent one side of table top 5 extend into a selected one of the slots 38 in the upper arm 37 of the brackets 35. Wedges 19 in the vertical slots 21 of the T-shaped members 18 secure the upper arms 37 of the brackets 35 to the underside of table top 5. The lower arm 39 of each bracket 35 underlies the table top 5b in alignment with both channel-shaped tracks 9 of said last mentioned table top. A T-shaped connector member 18 carried by each of said channel-shaped tracks 9 extends into the end slot 40 of the corresponding bracket arm 39. Wedges 19 are inserted in the vertical slots 21 of said T-shaped connector members 18 to secure the lower arms 39 of brackets 35 to the underside of table top 5b.

FIGS. 13 and 14 show a further modification in which a table top 5 is secured to a second table top 5c at right angles to the first table top and in the same horizontal plane. A flat connector plate 42 is employed for this purpose. Plate 42 has a side slot 43 adjacent one end and an end slot 44 in the other end. The ends of plates 42 with the side slot 43 extends across the channel-shaped track 9 of table top 5 adjacent the abutting side of the table. T-shaped members 18 carried by said channel-shaped track 9 of table top 5 extend into slots 43 of plates 42 and are secured there by wedges 19. The other ends of plates 42 are aligned with channel-shaped tracks 9 of table top 5c. T-shaped members 18 carried by said last mentioned channel-shaped tracks 9 extend into the end slots 40 of said plates 42 and are secured by wedges 19 which compress the plates against the underside of the table top 5c.

FIGS. 15 to 18 illustrate a modified leg structure and connector plate therefor. The structure consists of crossed legs 50 which are connected to each other intermediate their lengths at 51. The upper end of each leg is secured to the bottom of a plate 52 having downwardly extending brackets 53 at the inner margin thereof. A cross-tie 54 extends between the plates with the opposite ends of the cross-tie secured between the brackets 53 of each plate 52 by bolts or other securing means 55. Slots 56 extend inwardly from opposing side edges of the plates 52 for the reception of a T-shaped member carried by the channel-shaped tracks 9 of a table top 5. A wedge 19 secures the plates 52 to the underside of the table top in the manner previously described. A stabilizing bracket 57 may also be provided between the crossed portion of the legs 50 and the underside of the table top.

Other modifications for the leg structure may also be provided for. For example, where vertically disposed legs are employed plates similar to plates 52 may be mounted on the top of each leg in lieu of the cross-plate 25. Also, plates similar to plates 52 but without the brackets 53 may be employed for independent connection of each leg to the underside of a table top. This latter arrangement is frequently desirable in the employment of wooden legs with a cross-tie therebetween intermediate the length of the legs.

In FIG. 19 I have illustrated a modified track arrangement beneath a table top 5. The table is longitudinally grooved, as indicated at 8, and strips 60 are secured by screws 61 to the underside of the table top on either side of groove 8 so that inner margins of the strips extend beyond the sides of the groove to define an intervening slot. The strips 60 may be set in recesses provided at either side of the groove 8 so that the outer surfaces of the strips are flush with the bottom surface of the table top 5.

FIG. 20 illustrates a modified form of the leg assembly shown in FIGS. 2 and 6. The cross-plate 25 is provided with pairs of slots 26 in opposite side edges, each pair being laterally spaced apart a distance equal to the spacing of the channel-shaped tracks 9 in the under side of the table top 5. With this arrangement pairs of T-shaped connectors 18 projecting from each track 9 will be fitted in the opposing pair of slots 26 which register with the corresponding track 9 and will be secured in place by wedges 19. This arrangement provides greater stability for the leg assembly.

The above illustrations and examples of certain modifications are deemed to be fairly representative of various combination assemblies. However, it is not intended that the above should be construed as limitations since various other combinations and modifications may also be resorted to within the scope and spirit of this invention as defined by the appended claims.

What I claim is:

1. Fastening means connecting together two parts of an article of furniture, said fastening means comprising parallel members having spaced apart edges defining an intervening slot, said parallel members being attached to one of said parts so that a space is reserved between said last mentioned part and surfaces of the parallel members facing toward said part to define a slotted track, a plate member carried by the other of said parts and adapted to flatly engage said track, a slot provided in said plate member to underlie the intervening slot of said track when the plate member flatly engages said track, a T-shaped member having its head portion arranged in said space between the first part and the surfaces of the parallel members facing toward said first part so as to be slidable along said track and having its shank portion projecting through said intervening slot, said shank portion also projecting through the slot in said plate member and being provided with a vertically extending slot, the lower portion of which extends below said plate member, and a wedge slidably fitted in the vertical slot of said shank portion and engaging the side of said plate remote from the track to exert contact pressure between said plate and track.

2. Fastening means as set forth in claim 1, in which said track comprises a substantially channel-shaped member provided with inturned parallel flanges having spaced apart edges defining said intervening slots, said channel member being secured to said first part to extend longitudinally thereof.

3. Fastening means as set forth in claim 2, in which said first part comprises a table top provided with a longitudinally extending groove in the underside thereof, said channel member being secured in said groove so that the intervening slot between the edges of said flanges is accessible from the underside of said table top.

4. Fastening means as set forth in claim 1, in which said first part of the article of furniture comprises a table top provided with longitudinally extending grooves in the underside thereof, said parallel members being secured to the underside of said table top with marginal portions projecting inwardly of the sides defining each groove with the edges of said parallel members spaced to define said intervening slot.

5. Fastening means as set forth in claim 1, in which said first part of the article of furniture comprises a table top having said track mounted on the underside thereof, said plate constituting one flange of a bracket, and said second part comprises a pedestal, said bracket being provided with a second flange directly secured to the upper end of the pedestal whereby the table top is superimposed on said pedestal when the plate and track are in pressure contact.

6. Fastening means as set forth in claim 1, in which said first part of the article of furniture comprises a table top having said track mounted on the underside thereof, said second part comprises a leg structure, and said plate is carried by the upper end of the leg structure.

7. Fastening means as set forth in claim 1, in which said one and said other part of the article of furniture comprise table tops, said other part having a track mounted on the underside thereof, said plate being secured to the other of said parts by a separate T-shaped member arranged in the track of said other part and having its shank extending through an additional slot in the plate aligned with and underlying the track of said other part, and a further edge fitted in a vertical slot in the shank of the separate T-shaped member to bear against the underside of said plate.

8. Fastening means as set forth in claim 7, in which said plate is flat throughout its length and said slots are provided in each end edge to secure said table tops in end-to-end relation in a common horizontal plane.

9. Fastening means as set forth in claim 7, in which said plate is flat throughout its length and said slots are provided in one end edge and a slot in at least one side edge adjacent the opposite end to secure said table tops in a common plane so that the end of one table top abuts one side of the other table top.

10. Fastening means as set forth in claim 7, in which said plate is Z-section to provide top and bottom flanges extending on opposite sides of a vertical intermediate section in parallel planes, said slots being provided in one edge of each of said top and bottom flanges to receive the shank of a T-shaped member carried by the track of a corresponding table top whereby the two table tops are connected together at different horizontal levels.

References Cited in the file of this patent

UNITED STATES PATENTS

| | | |
|---|---|---|
| 2,549,943 | Snider | Apr. 24, 1951 |
| 2,560,400 | Abrahamson | July 10, 1951 |
| 2,759,779 | Bergman | Aug. 21, 1956 |
| 2,801,141 | Bergman | July 30, 1957 |